United States Patent [19]

Watson et al.

[11] Patent Number: 5,818,865
[45] Date of Patent: Oct. 6, 1998

[54] COMPACT EXCIMER LASER INSULATOR WITH INTEGRAL PRE-IONIZER

[75] Inventors: Tom Arthur Watson; William Norman Partlo, both of San Diego, Calif.

[73] Assignee: Cymer, Inc., San Diego, Calif.

[21] Appl. No.: 857,395

[22] Filed: May 16, 1997

[51] Int. Cl.[6] .................................................. H01S 3/097
[52] U.S. Cl. ............................................................ 372/86
[58] Field of Search ........................................ 372/86, 87

[56] References Cited

U.S. PATENT DOCUMENTS

| | | |
|---|---|---|
| 4,959,840 | 9/1990 | Akins et al. . |
| 5,033,055 | 7/1991 | Akins et al. . |
| 5,239,553 | 8/1993 | Ono et al. ................................. 372/86 |
| 5,247,534 | 9/1993 | Mueller-Horsche ...................... 372/86 |
| 5,313,486 | 5/1994 | Nakatani .................................. 372/86 |
| 5,337,330 | 8/1994 | Larson ..................................... 372/86 |
| 5,347,531 | 9/1994 | Nakatani et al. ........................ 372/86 |
| 5,377,215 | 12/1994 | Das et al. . |

*Primary Examiner*—Leon Scott, Jr.
*Attorney, Agent, or Firm*—David G. Beck

[57] ABSTRACT

A pre-ionizing system in which the pre-ionizer elements are integral with the cathode insulating plate is provided. The cathode insulating plate includes a recessed region machined into the front surface into which the cathode fits, lying substantially flush with the insulator front surface. The back surface of the insulating plate contains a pair of slots running parallel to the long axis of the cathode. The pre-ionizing rods are located within these slots, the slots having sufficient depth to locate the rods approximately adjacent to the cathode. By maintaining the rods at ground, a capacitor is formed in which the insulating plate material between the rod and the cathode acts as the dielectric material of the capacitor. When a voltage pulse is applied, a capacitive corona discharge is formed which pre-ionizes the gases in the region near the cathode.

18 Claims, 7 Drawing Sheets

COMPACT EXCIMER LASER INSULATOR WITH INTEGRAL PRE-IONIZER

The present invention relates generally to lasers and, more particularly, to an apparatus for pre-ionizing the gases in an excimer laser system.

BACKGROUND OF THE INVENTION

Lasers are used in a wide and expanding variety of applications. For example, lasers are used in various medical applications such as to repair torn or detached retinas in eyes or to eliminate plaque from arteries. Lasers are also used in the manufacture of semiconductors to produce patterns of electrical circuits on the surfaces of the semiconductor layers and to drill holes at precise positions in the semiconductors. Lasers are advantageous in these and other applications because they generate coherent radiation of high intensity in a narrow band of wavelengths.

Laser systems generally include a sub-system which pre-ionizes the gas in the laser to facilitate the ionization and chemical reaction of the gases in the cavity when an electrical discharge is produced between an anode and a cathode in the laser. The pre-ionizer may include at least one tube from which a corona discharge is directed to the gases in the cavity. The corona discharge occurs when a voltage pulse is preferably applied between a conductor inside the tubes and at least one conductor outside the tube. Bushings are disposed near the ends of the tubes to maintain the tubes in an insulated relationship. Members are associated with the tubes to position the tubes at a particular position in the laser.

The pre-ionizers now in use have certain inherent disadvantages. In many systems the bushings are not homogeneous with the tube, thus requiring that the bushings be attached to the tube as by an adhesive. This has limited the utility of the pre-ionizer, particularly over extended periods of time, since the adhesive has tended to deteriorate under the effect of the corona environment. This deterioration of the adhesive poisons the laser gases, requiring more frequent gas changes. The adhesive has also limited the voltage which can be applied between the plates of a capacitor which includes the tube as the dielectric between the capacitor plates.

U.S. Pat. No. 5,337,330, entitled "Pre-Ionizer for a Laser" discloses an improved pre-ionizing tube. The disclosed tube includes bushings at either end, the bushings being homogeneous with the tube. The homogeneous tube avoids the problems of adhesive deterioration. However this system, as in previous systems, still requires a cavity of excessive length to provide sufficient space for the tube and bushing assembly. The additional required length lowers the overall efficiency and thus output power.

From the foregoing, it is apparent that an improved pre-ionizer which does not extend beyond the laser electrode assembly is desired.

SUMMARY OF THE INVENTION

The present invention provides a pre-ionizing system in which the pre-ionizer elements are integral with the cathode insulating plate. The cathode insulating plate includes a recessed region machined into the front surface. The cathode fits into the recessed region and lies substantially flush with the insulator front surface. Due to the recessed mounting of the cathode, the width of the insulating plate can be reduced while still maintaining sufficient electrical isolation to prevent tracking or arcing to nearby ground potential structures.

The back surface of the insulating plate contains a pair of slots running parallel to the long axis of the cathode. The pre-ionizing rods are fitted within these slots, the slots having sufficient depth to locate the rods approximately adjacent to the end of the cathode. By maintaining the rods at ground potential, a capacitor is formed in which the insulating plate material between the rod and the cathode acts as the dielectric material of the capacitor. Thus the insulating material must exhibit properties which support a capacitive corona discharge.

In the preferred embodiment, the pre-ionizing rods are electrically coupled to ground along the back surface. The rods are approximately the same length as the cathode and do not extend beyond the insulating plate. Given this configuration, the laser cavity may be substantially reduced in length, thus leading to improved operating efficiency and output power.

In another embodiment of the invention, the back surface of the insulating plate is mounted directly to the cavity housing without the use of stand-offs. This allows the pre-ionizing rods to be brought into direct contact with the cavity housing held at ground potential without the use of additional wires.

A further understanding of the nature and advantages of the present invention may be realized by reference to the remaining portions of the specification and the drawings.

DESCRIPTION OF THE PREFERRED EMBODIMENT

Figure 1:
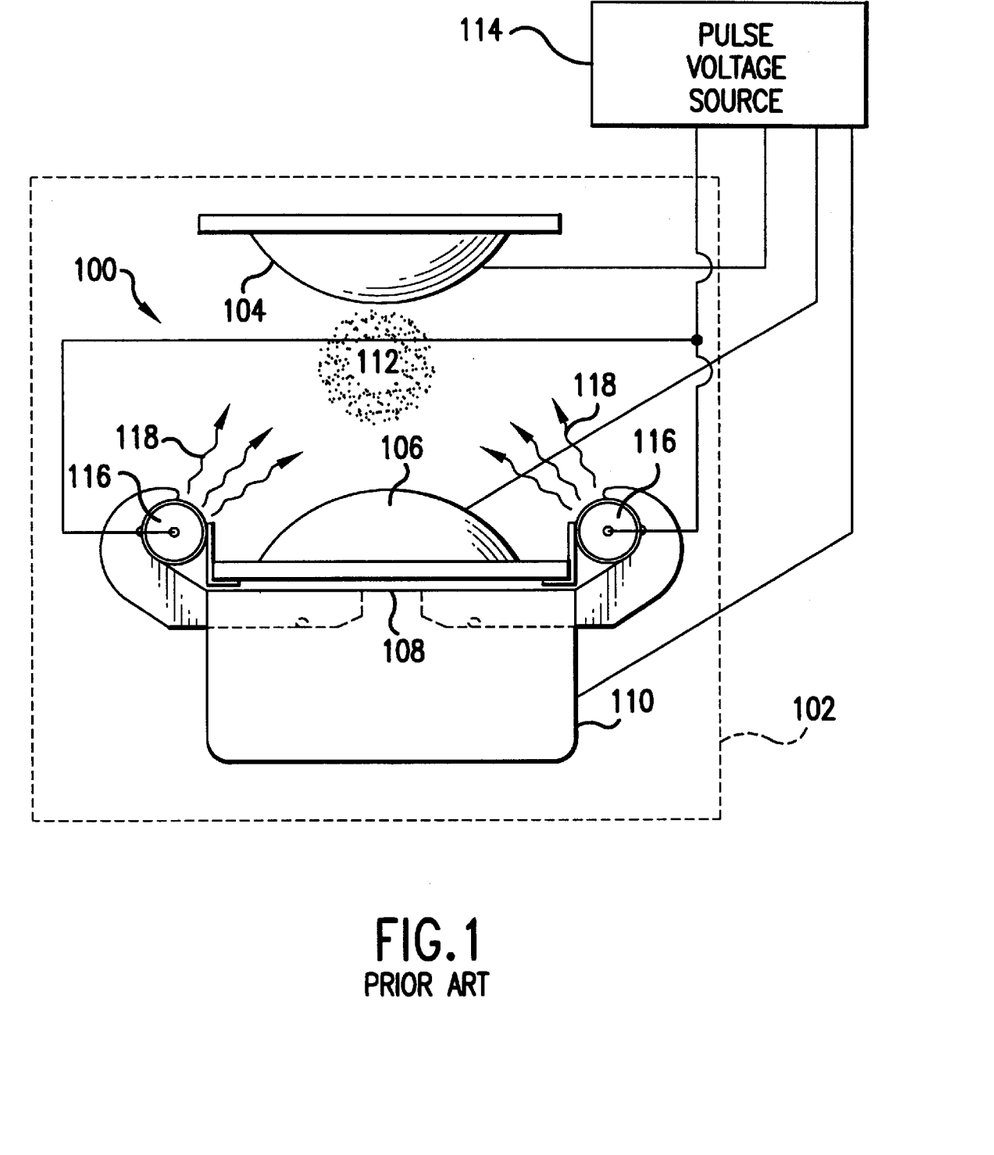
FIG. 1 is a schematic end illustration of an excimer laser including a pre-ionizer according to the prior art.

In one embodiment of the prior art, a laser generally indicated at 100 is disposed within a cavity indicated in broken lines at 102 in FIG. 1. The general construction of this laser may correspond to that disclosed in U.S. Pat. Nos. 4,959,840 (entitled "Compact Excimer Laser Including an Electrode Mounted in Insulating Relationship to Wall of the Laser"), 5,033,055 (entitled "Compact Excimer Laser"), 5,377,215 (entitled "Excimer Laser"), and 5,377,330 (entitled "Pre-Ionizer for a Laser"), all of which are commonly assigned to the assignee of this application and are incorporated by reference for any and all purposes.

The laser 100 includes an anode 104 and a cathode 106 which are disposed in cavity 102 and which are separated from each other in a first direction. Anode 104 may be electrically grounded. Electrically conductive members 108 provide electrical continuity from cathode 106 to an electrically conductive block 110. Gases are disposed in the cavity. In one type of system, the gases may be krypton (Kr) and fluorine ($F_2$). Alternatively, other gases may be used.

The gases are indicated schematically at a location 112 by dots within cavity 102. Gases 112 may be recirculated and may be purified during recirculation.

When a voltage pulse is applied from a source 114 between anode 104 and cathode 106 (preferably with the high voltage on the cathode), an electrical discharge is produced between the anode and the cathode. This electrical discharge ionizes gases 112 and causes a chemical reaction to be produced between the gases. For example, Kr and $F_2$ in cavity 102 react chemically to produce krypton fluoride (KrF). When this chemical reaction occurs, energy as in the form of light is produced at a particular wavelength in cavity 102. The coherent energy is produced with high intensity and in a narrow beam. It is directed from the cavity through a window (not shown).

Pre-ionizers generally indicated at 116 may be disposed in cavity 102 to facilitate the ionization of gases 112 by introducing ultraviolet light. The ultraviolet light is produced by a corona discharge to the gases just before each voltage pulse is applied between anode 104 and cathode 106. The direction of the radiation emitted by the corona discharge is indicated schematically in FIG. 1 by wavy lines 118 with arrows at the upper ends of the lines to indicate the direction of the radiation.

Pre-ionizers 116 may be disposed between electrodes 104 and 106 and may be separated from each other in a second direction transverse, preferably perpendicular, to the first direction. Pre-ionizers 116 extend in cavity 102 in a third direction transverse, preferably perpendicular, to the first and second directions. Electrodes 104 and 106 also extend in cavity 102 in the third direction. This third direction may be considered to be into the plane of the paper in FIG. 1.

Figure 2:
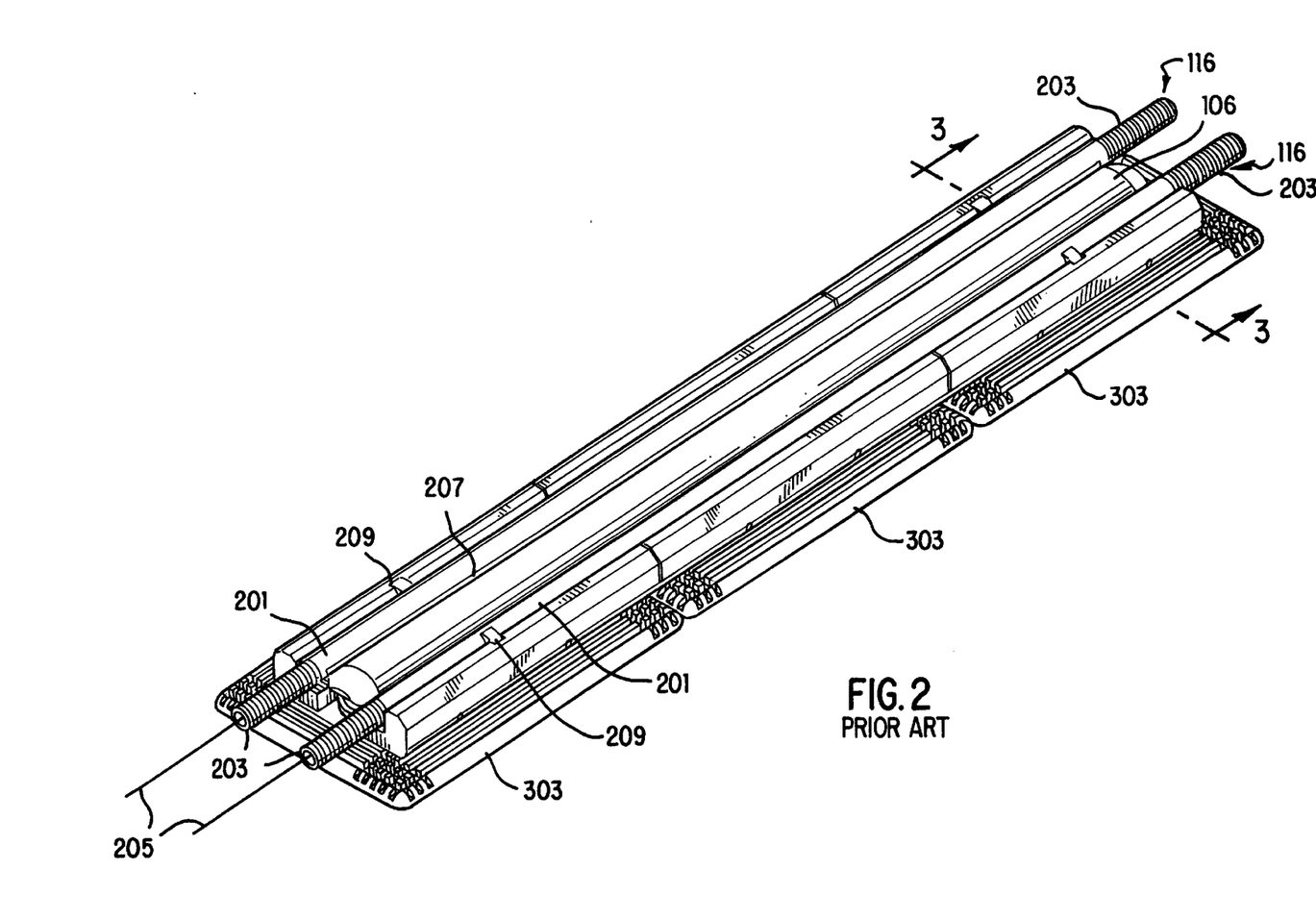
FIG. 2 is a perspective view of a particular cathode/pre-ionizer assembly separated from the laser cavity.

FIG. 2 is a perspective view of a specific cathode/pre-ionizer assembly separated from the laser cavity. On either side of cathode 106 and running in the same direction as cathode 106 are pre-ionizers 116. Each pre-ionizer includes a hollow tube 201 made from a suitable material providing a high dielectric constant and a high dielectric strength. Preferably tubes 201 are made from a ceramic material such as a polycrystalline translucent aluminum oxide.

Disposed on either end of tubes 201 are bushings 203. Preferably the material of bushings 203 are homogeneous with the material of tubes 201. Even more preferably, the material of bushings 203 is identical to the material of tubes 201. Tubes 201 and bushings 203 may be fabricated from a single piece of material, thus achieving the same high dielectric properties and eliminating the need for any adhesive between tubes 201 and bushings 203.

An electrical conductor 205 is disposed within each tube 201. Preferably conductor 205 is electrically coupled to the laser housing which is held at ground. An electrical conductor 207 is disposed on the surface of tube 201, running approximately the full length of electrode 106 and between bushings 203. Conductors 207 may be in the form of resilient springs constrained to be disposed against the surfaces of associated tubes 201 with a moderate force. Conductors 207 are held at the potential of cathode 106. Bushings 203 prevent electrical discharge or arcing along tubes 201 from conductors 207 to the laser housing.

Figure 3:
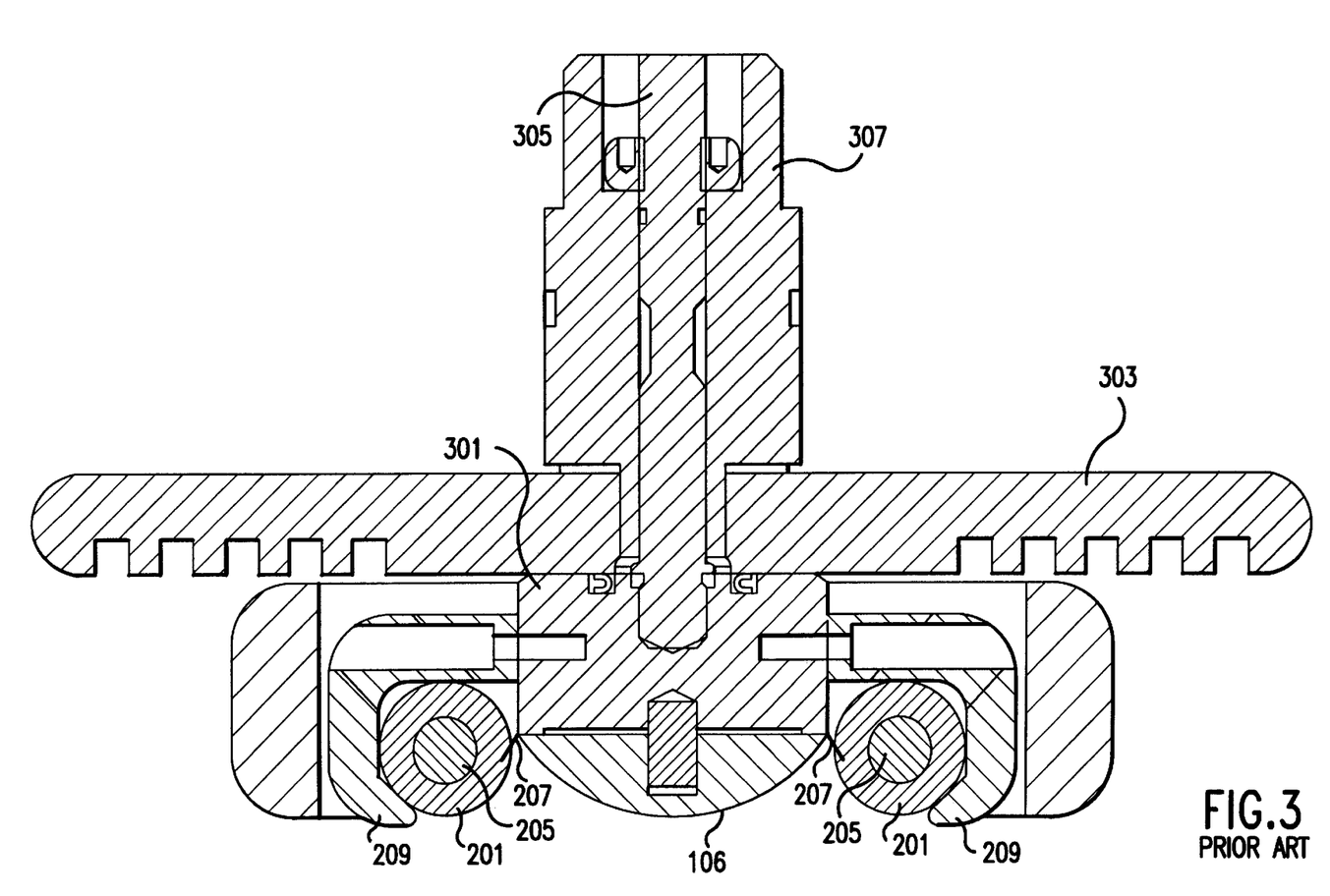
FIG. 3 is a cross-sectional illustration of the cathode/pre-ionizer assembly illustrated in FIG. 2.

Tubes 201 are held in place and against conductors 207 by several positioning members 209. FIG. 3 is a cross-sectional illustration of the cathode/pre-ionizer assembly at a location AA. Positioning members 209 hold tubes 201 against conductors 207. Preferably positioning members 209 are fabricated from an insulating material. Members 209 may also be of a conducting material, however this configuration may lead to downstream arcing. Conductive positioning members may also interfere with the formation of a corona discharge in the area immediately surrounding the members.

Electrical conductors 205 and 207 define first and second plates of a capacitor. Tubes 201 serve as the dielectric material between the plates of the capacitors. Preferably a high voltage is applied to electrical conductors 207, such as the cathode potential, and electrical conductors 205 are grounded. The dielectric material of tubes 201 has properties to support a capacitive corona discharge without dielectric breakdown.

When a voltage pulse from source 114 is applied between electrical conductors 205 and 207, the electrical charges cause corona discharges (indicated by the wavy lines 118 in FIG. 1) to be produced from the surfaces of tubes 201. These corona discharges emit radiation which travel to the space where gases 112 are located. The radiations pre-ionize gases 112 so that the ionization of the gases is facilitated when a voltage pulse is produced between anode 104 and cathode 106.

In the specific cathode assembly illustrated in FIG. 3, cathode 106 is mounted to a spacer 301. Spacer 301 extends between cathode 106 and a main insulator plate 303. Preferably main insulator plate 303 is made of a ceramic, such as aluminum oxide. Spacer 301 provides an electrical connection to cathode 106 from metal rods 305. Surrounding each metal rod 305 is an insulating bushing 307, preferably made of a material such as ceramic. Main insulator plate 303 electrically insulates cathode 106 from the walls of the laser housing 102 which are preferably held at ground potential. Thus insulator plate 303 insures that the proper electrical discharge takes place between cathode 106 and anode 104.

When high voltage is applied to cathode 106 via the high voltage connected to rods 305, there is a tendency for undesirable currents to flow over the surface of main insulator plate 303 to the grounded walls of housing 102. How well insulator 303 resists this current flow depends in part on the distance these currents have to flow (the farther the better), and on how close the surfaces of the main insulator are to the grounded housing walls 102 (again, the farther the better).

Preferably the walls of housing 102 includes downwardly extending portions so that main insulator 303 is stood off from, or floating relative to, the housing wall. Floating insulator 303 relative to housing 102 maximizes, for a given insulator size, the distance parasitic currents must flow to reach housing 102 held at ground potential. Additionally, spacing the surface of main insulator plate 303 away from the grounded housing 102 reduces the capacitive coupling between the parasitic surface currents and ground. In short-pulse lasers in which the excitation is applied for very short durations, the capacitive coupling between the surface currents and ground enhances the flow of current. By spacing main insulator 303 away from housing 102, capacitive coupling and hence parasitic current flow is reduced.

Figure 4:
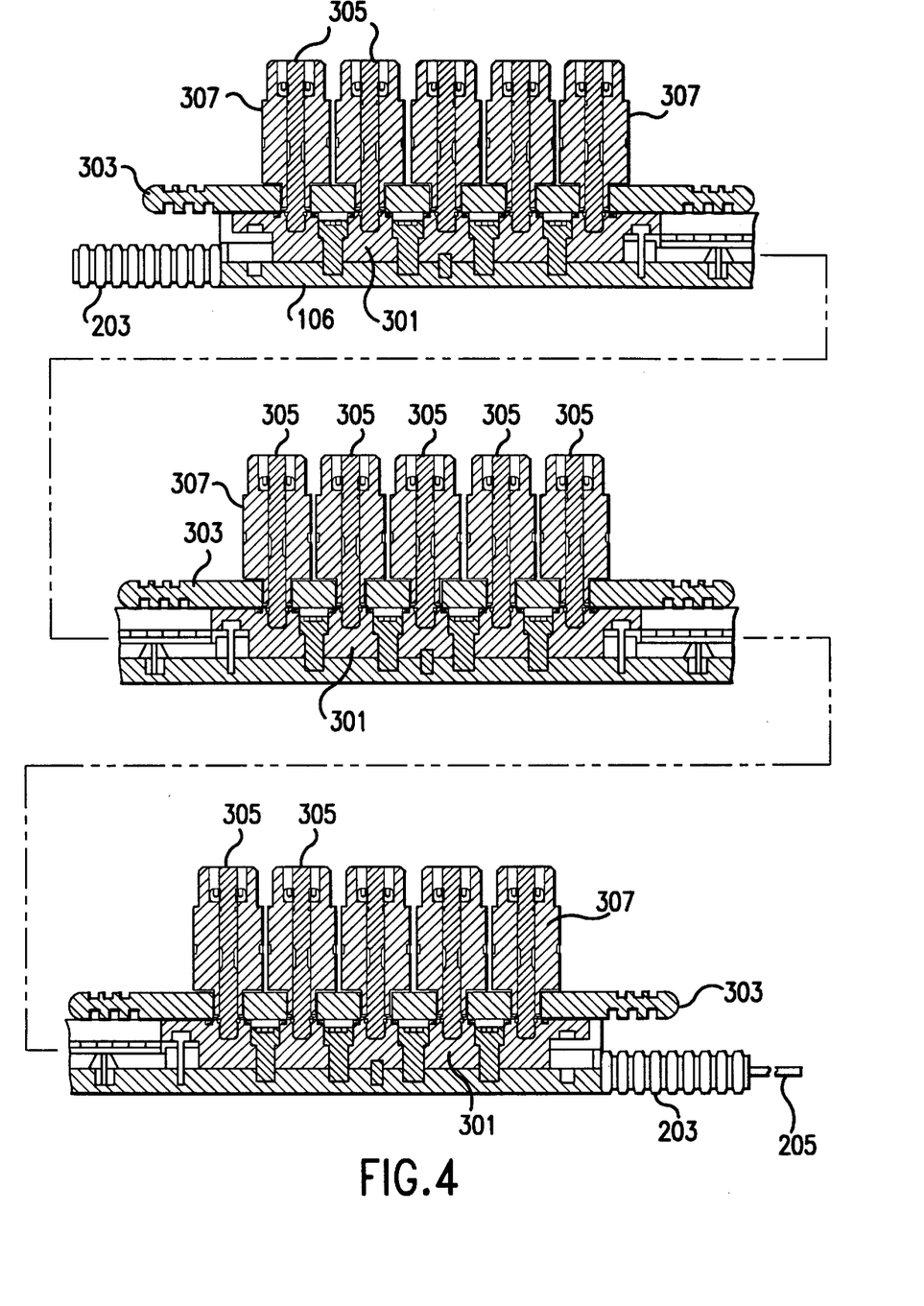
FIG. 4 is a cross-sectional view of an entire cathode/pre-ionizer assembly according to the prior art.

FIG. 4 is a cross-sectional view of an entire cathode/pre-ionizer assembly according to the prior art. As shown, single cathode 106 is coupled to three sets of five conducting rods 305. Each set of conducting rods 305 are coupled through a single conducting spacer 301. Although three main insulator plates 303 are shown, a single larger insulating plate could be used instead.

Figure 5:
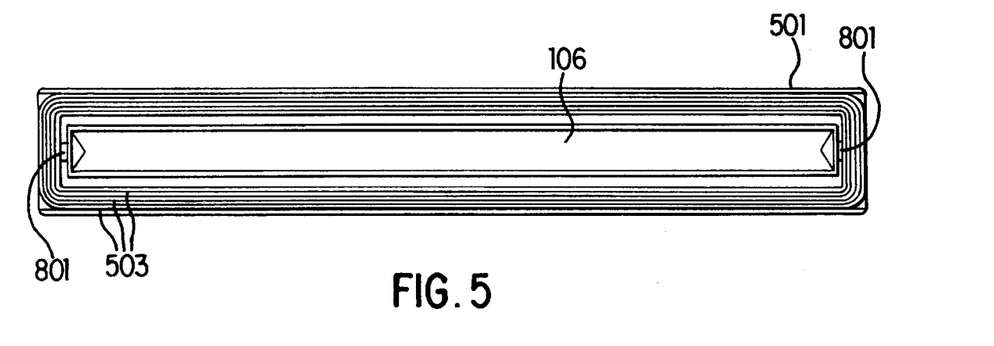
FIG. 5 is an illustration of a main insulator plate according to the present invention.

FIG. 5 is an illustration of a main insulator plate 501 according to the present invention. As in the prior art, plate 501 is preferably fabricated from a ceramic such as aluminum oxide. Cathode 106 fits within a recessed region of plate 501. Machined into plate 501 is a series of grooves 503.

Figure 6:
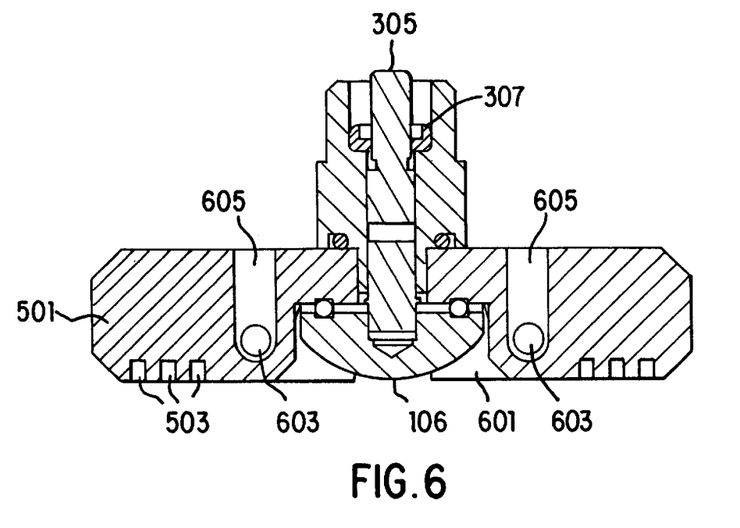
FIG. 6 is a detailed cross-sectional view of the preferred embodiment of the insulator plate.

FIG. 6 is a detailed cross-sectional view of the preferred embodiment of insulator plate 501. In contrast to the prior art shown in FIG. 3 in which the cathode is mounted above insulating plate 303 with conducting spacer 301, the cathode in the present invention is almost completely buried within recess 601 of insulating plate 501. This configuration aids in electrically isolating the cathode, thus allowing the cathode to be placed in closer proximity to surfaces which are at ground potential such as the laser housing.

Grooves 503 are used to further enhance the electrical isolating capabilities of insulator plate 501. Preferably no grooves are required, thus minimizing fabrication time and costs. The number of grooves 503 required, if any, is driven by the specific design of the laser. The principal factor is the proximity of the cathode to any current carrying member and/or to any member held at ground potential, thus impacting the overall size of the laser system. Additionally, the magnitude of the high voltage pulse impressed upon the cathode factors into the design of grooves 503.

As described above, the present invention does not require the use of a conducting spacer, such as prior art spacer 301 shown in FIG. 3. Instead, cathode 106 is directly coupled to electrical rods 305. As before, rods 305 are isolated with insulators 307.

Figure 7:
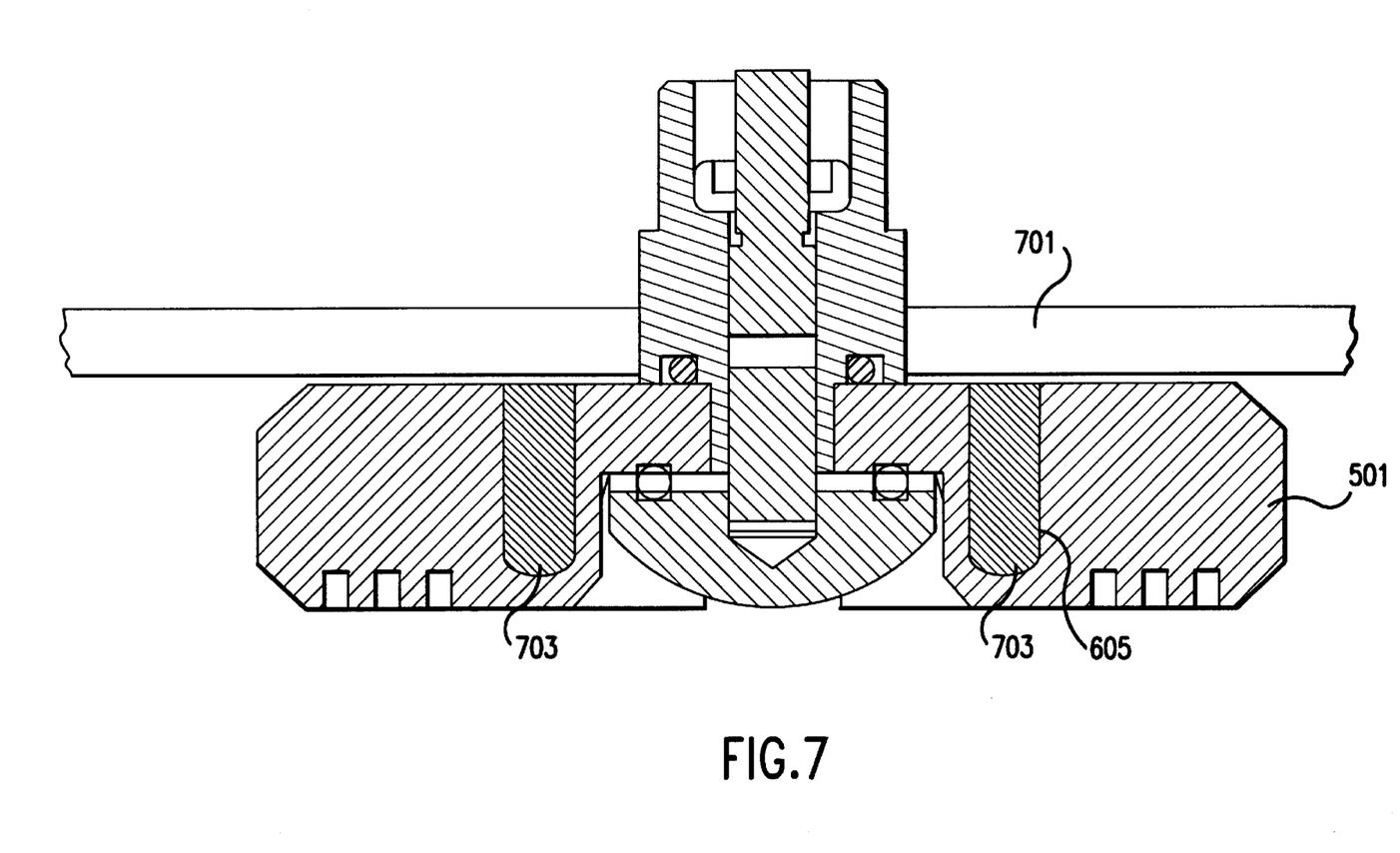
FIG. 7 illustrates a specific embodiment of the present invention.

Pre-ionizing wires 603 are held within grooves 605 formed in the back surface of insulating plate 501. As in the prior art, wires 603 are preferably maintained at the ground potential. FIG. 7 illustrates another embodiment of the present invention. In this embodiment insulating plate 501 is directly coupled to a section of the cavity housing 701. Within grooves 605 are pre-ionizing members 703. In this embodiment pre-ionizing members 703 are in contact with housing 701 and are therefore held at ground potential. Thus this embodiment does not require wires to couple the pre-ionizing rods to either the housing or another member held at ground potential, leading to a further reduction in the required size of the laser system.

Due to the integration of the pre-ionizing wires into the back surface of insulating plate 501, the overall length of the laser can be shortened considerably. As a result of the reduction in length, laser operating efficiency and output power is improved. As illustrated in FIG. 2, the prior art approach requires that both ends of tubes 201 be coupled to bushings 203. Bushings 203 are necessary to isolate pre-ionization wires 205, thereby preventing discharge from wires 205 to either cathode 106 or electrical conductors 207. The addition of bushings 203 add considerable length to the laser cavity, decreasing the laser's efficiency and output power.

Since pre-ionization wire 603 or pre-ionization rod 703 in the embodiment illustrated in FIG. 7 never extend beyond insulating plate 501 in a direction corresponding to the long axis of cathode 106, the present invention does not require a component similar to bushings 203. This results in a more compact, and therefore more efficient, laser system.

In addition to the benefits of improved operating efficiency, the present invention also results in a simpler and therefore less costly design. For example, the embodiment illustrated in FIG. 7 does not require separate pre-ionization tubes 201, bushings 203, conducting members 207, pre-ionization tube supports 209, or conducting spacers 301. Furthermore, due to the recessed cathode design of the present invention, insulating plate 501 is not as wide as the prior art insulating plate, thus reducing the size of the ceramic material required to fabricate the plate.

Figure 8:
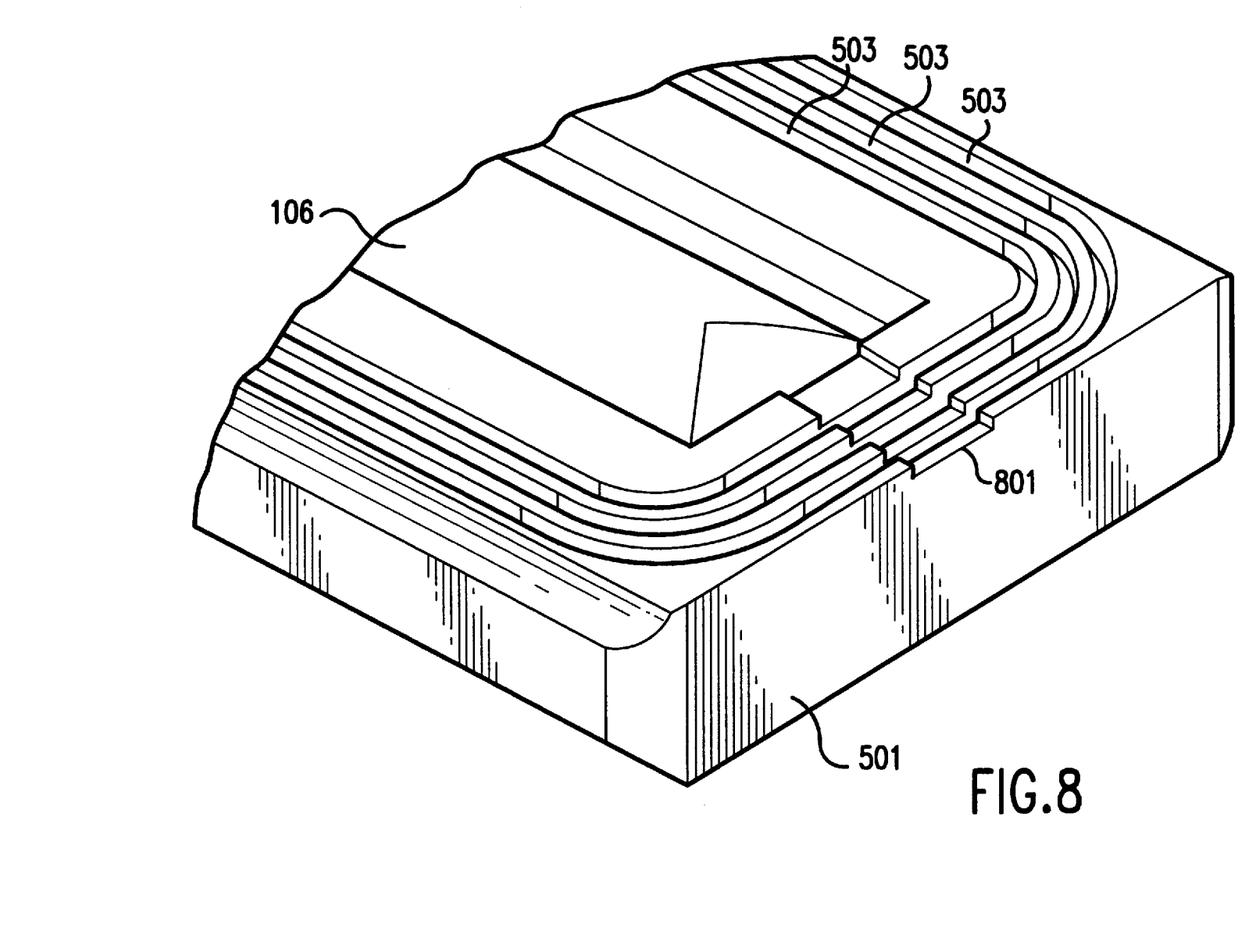
FIG. 8 is a perspective view of the insulating plate illustrated in FIG. 5

FIG. 8 is a perspective view of insulating plate 501. In this particular embodiment a small channel 801 is cut into plate 501 at either end of the plate to insure that the insulating plate does not interfere with the laser optical cavity. Channel 801 is simply a precaution due to the outer surface of cathode 106 being slightly lower than the surrounding insulating plate. Furthermore optical clipping becomes more likely as cathode 106 erodes and the outer cathode surface becomes even more recessed.

As will be understood by those familiar with the art, the present invention may be embodied in other specific forms without departing from the spirit or essential characteristics thereof. Accordingly, the disclosures and descriptions herein are intended to be illustrative, but not limiting, of the scope of the invention which is set forth in the following claims.

We claim:

1. A pre-ionizer for use in a laser, comprising:
    a member with a first surface and a second surface, said member constructed of a dielectric material having properties to support a capacitive corona discharge without dielectric breakdown;
    a recessed region in said first surface of said member;
    a first electrode within said recessed region of said first surface, said first electrode defining a first capacitor plate;
    at least one recessed region in said second surface of said member;
    a second electrode within said recessed region of said second surface, said second electrode defining a second capacitor plate; and
    a voltage source for introducing a voltage between said first and second electrodes to charge the capacitor and form a corona discharge from said member.

2. The pre-ionizer of claim 1, wherein said first electrode is a cathode for said laser.

3. The pre-ionizer of claim 2, wherein said cathode has a first surface and a second surface, said first surface of said cathode in contact with said member and said second surface of said cathode substantially parallel to said first surface of said member.

4. The pre-ionizer of claim 1, wherein said recessed region in said second surface of said member has a length substantially equivalent to a length of said recessed region in said first surface of said member.

5. The pre-ionizer of claim 1, wherein said first electrode has a length substantially equivalent to a length of said second electrode.

6. The pre-ionizer of claim 1, wherein said member has at least one continuous groove on said first surface of said member, said groove circumscribing said recessed region on said first surface.

7. The pre-ionizer of claim 1, further comprising:
    an anode in said laser, wherein said first electrode is a cathode in said laser;
    a cavity including said anode and said cathode; and
    a laserable gas medium in said cavity, wherein radiation emitted by said corona discharge facilitates ionization of said gas when an electrical discharge occurs between said cathode and said anode.

8. The pre-ionizer of claim 7, wherein said cavity has a length substantially equivalent to a length of said member.

9. A laser, comprising:
    a housing;
    an insulating plate coupled to an internal surface of said housing, wherein a first surface of said insulating plate is coupled to said housing internal surface;
    a cathode coupled to a second surface of said insulating member;

an anode;

a pre-ionizing element located in a slot, said slot formed in said first surface of said insulating plate, wherein said pre-ionizing element defines a first plate of a capacitor and said cathode defines a second plate of said capacitor, said insulating plate constructed of a dielectric material having properties to support a capacitive corona discharge without dielectric breakdown;

a laserable gas medium within said housing; and a voltage source for introducing a voltage between said cathode and said pre-ionizing element to charge the capacitor and form a corona discharge, said corona discharge facilitating ionization of said laserable gas medium.

10. The laser of claim 9, wherein said housing is at a ground potential and said pre-ionizing element is in electrical contact with said housing.

11. The laser of claim 9, wherein said second surface of said insulating plate is recessed.

12. The laser of claim 9, wherein at least one continuous groove is formed in said insulating plate, said groove circumscribing said cathode.

13. The laser of claim 11, wherein said insulating plate has a first end and a second end, wherein a first channel and a second channel are formed in said insulating plate, said first channel running from said recessed second surface to said first end, and said second channel running from said recessed second surface to said second end, wherein said first and second channels minimize optical clipping by said insulating plate.

14. A pre-ionizer for use in a laser, comprising:

an insulating plate with a width, a length, a first surface, and a second surface, said insulating plate constructed of a dielectric material having properties to support a capacitive corona discharge;

a recess formed in said first surface of said insulating plate, said recess having a length less than said insulating plate length and a width less than said insulating plate width;

a cathode fitted within said recess, said cathode defining a first capacitor plate of a first capacitor and a first capacitor plate of a second capacitor, said cathode having a thickness substantially equivalent to a depth associated with said recess;

a first slot formed in said second surface of said insulating plate, said first slot having a length substantially equivalent to said recess length;

a second slot formed in said second surface of said insulating plate, said second slot having a length substantially equivalent to said recess length, wherein said first slot and said second slot are substantially parallel;

a first pre-ionizing element fitted within said first slot, said first pre-ionizing element defining a second capacitor plate of said first capacitor, said first pre-ionizing element electrically connected to a ground potential;

a second pre-ionizing element fitted within said second slot, said second pre-ionizing element defining a second capacitor plate of said second capacitor, said second pre-ionizing element electrically connected to said ground potential; and a voltage source for introducing a voltage between said cathode and said first pre-ionizing element and between said cathode and said second pre-ionizing element, said voltage introduction causing the formation of a first and a second corona discharge proximate said cathode.

15. The pre-ionizer of claim 14, further comprising at least one groove formed in said insulating plate first surface, said groove circumscribing said recess.

16. The pre-ionizer of claim 14, further comprising:

an anode in said laser;

a cavity including said anode and said cathode; and a laserable gas medium in said cavity, wherein radiation emitted by said first and second corona discharge facilitates ionization of said gas when an electrical discharge occurs between said cathode and said anode.

17. The pre-ionizer of claim 14, wherein said insulating plate has a first end and a second end, wherein a first channel and a second channel are formed in said insulating plate, said first channel running from said recess to said first end, and said second channel running from said recess to said second end, wherein said first and second channels minimize optical clipping by said insulating plate.

18. The pre-ionizer of claim 14, wherein said insulating plate is formed of an aluminum oxide.

* * * * *